(12) United States Patent
Park et al.

(10) Patent No.: US 10,101,837 B2
(45) Date of Patent: *Oct. 16, 2018

(54) DISPLAY DEVICE

(71) Applicant: LG DISPLAY CO., LTD., Seoul (KR)

(72) Inventors: SangRyeon Park, Gumi-Si (KR); Sangha Park, Gumi-si (KR); Byeongjo Min, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 225 days.

This patent is subject to a terminal disclaimer.

(21) Appl. No.: 15/197,270

(22) Filed: Jun. 29, 2016

(65) Prior Publication Data

US 2016/0306480 A1    Oct. 20, 2016

Related U.S. Application Data

(63) Continuation of application No. 13/678,252, filed on Nov. 15, 2012, now Pat. No. 9,442,585.

(30) Foreign Application Priority Data

May 29, 2012 (KR) .......................... 10-2012-0056762

(51) Int. Cl.
| | |
|---|---|
| *G06F 1/16* | (2006.01) |
| *G06F 3/0488* | (2013.01) |
| *B60K 35/00* | (2006.01) |
| *G06F 3/044* | (2006.01) |
| *H05K 1/18* | (2006.01) |

(Continued)

(52) U.S. Cl.
CPC .......... *G06F 3/0412* (2013.01); *G02B 6/0055* (2013.01); *G02B 6/0088* (2013.01); *G02F 1/1368* (2013.01); *G02F 1/13338* (2013.01); *G02F 1/133308* (2013.01); *G02F 1/133514* (2013.01); *G02F 1/133528* (2013.01); *G02F 1/134309* (2013.01); *G02F 1/136286* (2013.01); *G06F 1/16* (2013.01); *G06F 1/1643* (2013.01); *G06F 3/041* (2013.01); *G06F 3/047* (2013.01); *G02F 2001/133331* (2013.01);

(Continued)

(58) Field of Classification Search
CPC ...... G06F 1/1643–1/1658; G06F 3/016; G06F 3/044; G06F 3/04886
See application file for complete search history.

(56) References Cited

U.S. PATENT DOCUMENTS

| | | | |
|---|---|---|---|
| 2004/0141110 A1* | 7/2004 | Yu ...................... | G02F 1/13338 349/110 |
| 2006/0164230 A1* | 7/2006 | DeWind ................ | B60K 35/00 340/461 |

(Continued)

FOREIGN PATENT DOCUMENTS

WO    WO 2011/131865    * 10/2011    ............. G06F 3/041

*Primary Examiner* — Lin Li
(74) *Attorney, Agent, or Firm* — Seed Intellectual Property Law Group LLP

(57) ABSTRACT

Disclosed is a display device capable of decreasing a bezel width, wherein the display device comprises a display panel; a cover glass on an upper surface of the display panel; a housing member for receiving the display panel, and covering lateral and rear sides of the display panel and a lateral side of the cover glass; and a touch sensing film for sealing a gap between the lateral side of the cover glass and the housing member, the touch sensing film adhered to a lower surface of the cover glass.

16 Claims, 6 Drawing Sheets

(51) Int. Cl.
  *G02F 1/1333* (2006.01)
  *G06F 3/01* (2006.01)
  *G06F 3/041* (2006.01)
  *F21V 8/00* (2006.01)
  *G02F 1/1335* (2006.01)
  *G02F 1/1343* (2006.01)
  *G02F 1/1362* (2006.01)
  *G02F 1/1368* (2006.01)
  *G06F 3/047* (2006.01)

(52) U.S. Cl.
  CPC .. *G02F 2201/121* (2013.01); *G02F 2201/123* (2013.01); *G02F 2202/28* (2013.01)

(56) References Cited

U.S. PATENT DOCUMENTS

| | | |
|---|---|---|
| 2008/0158470 A1 | 7/2008 | Chung et al. |
| 2009/0103327 A1 | 4/2009 | Iwasaki et al. |
| 2009/0231500 A1 | 9/2009 | Ha et al. |
| 2010/0045618 A1* | 2/2010 | Huang .................... G06F 3/041 345/173 |
| 2010/0090972 A1* | 4/2010 | Kuwajima .......... G02F 1/13338 345/173 |
| 2011/0043483 A1 | 2/2011 | Mizuhashi et al. |
| 2012/0099292 A1 | 4/2012 | Yim |
| 2012/0139850 A1 | 6/2012 | Kim et al. |
| 2012/0169647 A1 | 7/2012 | Kuo |
| 2012/0242580 A1* | 9/2012 | Yamamoto ............ G06F 3/0416 345/168 |
| 2013/0038558 A1* | 2/2013 | Ujii ........................ G06F 3/041 345/173 |
| 2013/0056243 A1* | 3/2013 | Kim .................... H05K 1/0289 174/250 |
| 2013/0083491 A1* | 4/2013 | Rappoport ............ G06F 1/1656 361/722 |
| 2013/0141340 A1* | 6/2013 | Yilmaz ................. G06F 1/1643 345/173 |
| 2013/0176240 A1* | 7/2013 | Autran ................ G06F 3/03547 345/173 |
| 2013/0194759 A1* | 8/2013 | Kang .................... H05K 1/181 361/748 |
| 2013/0328785 A1* | 12/2013 | Brooks ................. G06F 1/1658 345/170 |

* cited by examiner

DISPLAY DEVICE

CROSS REFERENCE TO RELATED APPLICATIONS

The present patent document is a continuation of U.S. patent application Ser. No. 13/678,252, filed on Nov. 15, 2012, which claims the benefit of priority to Korea Patent Application No. 10-2012-0056762 filed on May 29, 2012, which is incorporated herein by reference for all purposes as if fully set forth herein.

BACKGROUND

Field of the Disclosure

The present disclosure relates to a display device, and more particularly, to a display device capable of decreasing a bezel width.

Discussion of the Related Art

A cathode ray tube (CRT) is disadvantageous in that it is heavy and has a large volume. Meanwhile, display devices using flat display panels are advantageous in that they reduce weight and volume. Thus, display devices using flat display panels such as liquid crystal display panel, plasma display panel and organic light-emitting display panel, are generally used.

The liquid crystal display panel and the organic light-emitting display panel display images by the use of switching element comprising a thin film transistor. The liquid crystal display panel and the organic light-emitting display panel are widely used for various devices, for example, television, computer monitor, notebook computer, tablet computer, navigation, portable terminal, mobile information device, and etc.

FIG. 1 is a perspective view illustrating a related art display device. FIG. 2 is a cross sectional view along I-I' of FIG. 1. In this case, the related art display device shown in FIG. 1 may be the portable terminal.

Referring to FIGS. 1 and 2, the related art display device includes a display panel 10, a backlight unit 20, a cover glass 30, a housing member 40 and a touch sensing film 50.

The display panel 10 includes an upper substrate 12, a lower substrate 14, a lower polarizing film 16, and an upper polarizing film 18. In this case, the upper substrate 12 and the lower substrate 14 confronting each other are bonded to each other. Also, the lower polarizing film 16 is adhered to a lower surface of the lower substrate 14, and the upper polarizing film 18 is adhered to an upper surface of the upper substrate 12. As a panel driver (not shown) is driven, the display panel 10 display a predetermined image.

The backlight unit 20 is received in the housing member 40, wherein the backlight unit 20 emits light to a display area of the display panel 10. For this, the backlight unit 20 includes a reflective sheet 22, a light-guiding plate 24 provided on the reflective sheet 22, a light source (not shown) for emitting light to an incidence surface provided at a lateral side of the light-guiding plate 24, and a plurality of optical sheet members 26 provided on the light-guiding plate 24.

The cover glass 30 is combined with the housing member 40 at a predetermined interval from an upper surface of the display panel 10, to thereby protect the display panel 10.

The housing member 40 receives the backlight unit 20 and the display panel 10 therein, and supports the cover glass 30. For this, the housing member 40 includes a support case 41 for receiving the backlight unit 20 therein; a guide panel 43 combined with the support case 41, wherein the guide panel 43 supports an edge portion of a lower surface of the display panel 10; a rear housing 45 for receiving the support case 41 therein; and a lateral housing 47 combined with the rear housing 45, wherein the lateral housing 47 supports the cover glass 30.

The lateral housing 47 covers respective lateral sides of the rear housing 45, the guide panel 43 and the cover glass 30. Especially, the lateral housing 47 is provided with a step-shaped cover glass supporter 47b, which is formed in an inner sidewall of an upper surface 47a of the lateral housing 47.

The cover glass supporter 47b supports an edge portion of a lower surface of the cover glass 30, wherein the cover glass supporter 47b is combined with the edge portion of the lower surface of the cover glass 30 by the use of double-sided tape 49. Accordingly, a lateral side of the cover glass 30 is covered by the lateral housing 47, whereby the lateral side of the cover glass 30 is not exposed to the external of the display device. That is, an upper surface of the cover glass 30 is positioned at the same height as the upper surface 47a of the lateral housing 47.

The touch sensing film 50 is adhered to the lower surface of the cover glass 30, to thereby sense a user's touch on the cover glass 30.

In the related art display device, the cover glass supporter 47b is formed in the upper surface of the lateral housing 47, and the cover glass 30 and the lateral housing 47 are combined with each other by the use of double-sided tape 49, whereby a width (T) of the lateral housing 47 is increased, that is, a bezel width (W) is increased in each of long sides of the display device.

SUMMARY

A display device comprises a display panel; a cover glass on an upper surface of the display panel; a housing member that receives the display panel, and covers lateral and rear sides of the display panel and a lateral side of the cover glass; and a touch sensing film that seals a gap between the lateral side of the cover glass and the housing member, the touch sensing film adhered to a lower surface of the cover glass.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EXEMPLARY EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a display device according to the present disclosure will be described with reference to the accompanying drawings.

Figure 3:
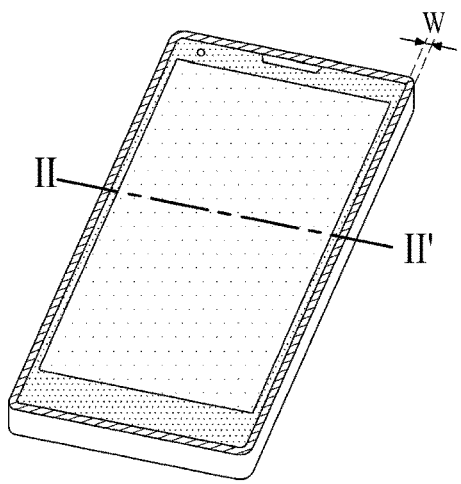
FIG. 3 is a perspective view illustrating a display device according to an embodiment of the present invention.
Figure 4:
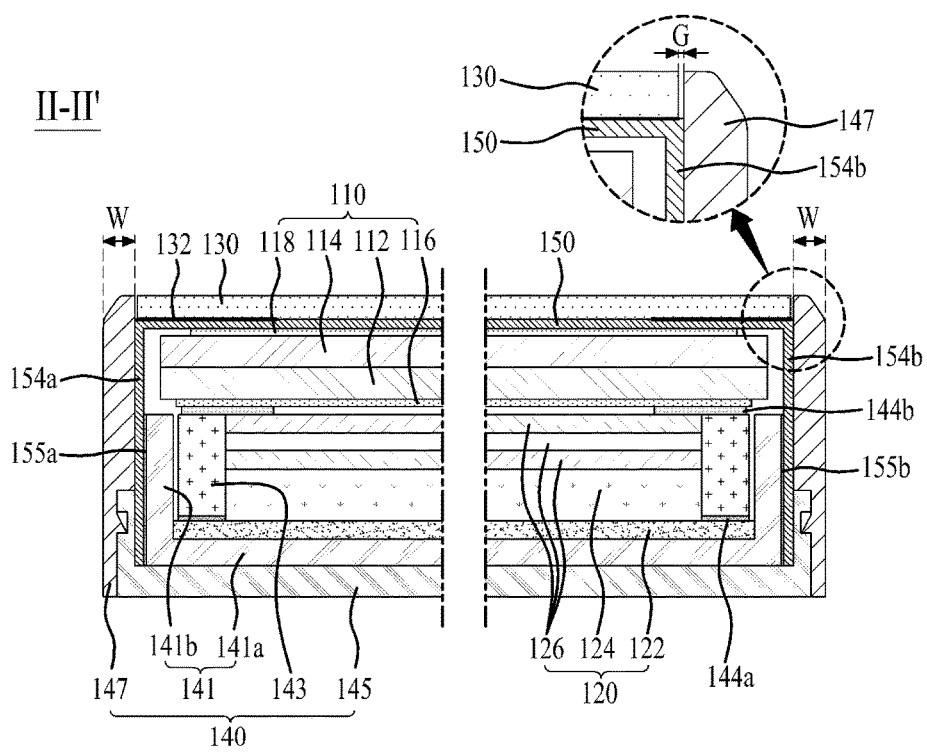
FIG. 4 is a cross sectional view illustrating a display device according to the first embodiment of the present invention, which is a cross sectional view along II-II' of FIG. 3.

FIG. 3 is a perspective view illustrating a display device according to an embodiment of the present invention. FIG. 4 is a cross sectional view illustrating a display device according to the first embodiment of the present invention, which is a cross sectional view along II-II' of FIG. 3. Herein, the display device shown in FIG. 3 may be a portable terminal.

Referring to FIGS. 3 and 4, the display device according to the first embodiment of the present invention includes a display panel 110; a backlight unit 120 for emitting light to the display panel 110; a cover glass 130 provided on the display panel 110; a housing member 140 for receiving the backlight unit 120 and the display panel 110 therein, and covering a lateral side of the display panel 110 and a lateral side of the cover glass 130; and a touch sensing film 150 adhered to a rear surface of the cover glass 130, wherein the touch sensing film 150 seals a gap (G) between the lateral side of the cover glass 130 and the housing member 140.

The display panel 110 is received in the housing member 140, wherein a predetermined image is displayed on the display panel 110 using light emitted from the backlight unit 120. For this, the display panel 110 includes a lower substrate 112, an upper substrate 114, a lower polarizing member 116, and an upper polarizing member 118.

On the lower substrate 112 of the display panel 110, there are a plurality of gate lines (not shown), a plurality of data lines (not shown), and a plurality of pixels (not shown), wherein each pixel is formed every area defined by crossing the gate and data lines. Each pixel may be provided with a thin film transistor (not shown) connected with the gate and data lines, a pixel electrode connected with the thin film transistor, and a common electrode supplied with a common voltage, wherein the common electrode is formed adjacent to the pixel electrode. According to a method for driving liquid crystal of a liquid crystal layer, the common electrode may be formed on the upper substrate 114. On the lower substrate 112, an electric field corresponding to a differential voltage between data voltage and common voltage applied to each pixel is formed to thereby control light transmittance of the liquid crystal layer.

At an edge region of a lateral side of the lower substrate 112, there is a pad (not shown) connected with each signal line, wherein a panel driver (not shown) is combined with the pad (not shown).

In a non-display area of one short side or both short sides of the lower substrate 112, there is a gate driving circuit (not shown) for supplying a gate signal (or scan signal) to the gate line. The gate driving circuit to be connected with each gate line is formed during a process for forming the thin film transistor for each pixel.

On the upper substrate 114, there is a color filter corresponding to each pixel of the lower substrate 112. Then, the lower substrate 112 and the upper substrate 114 confronting each other are bonded to each other, and the liquid crystal layer (not shown) is interposed therebetween. According to the method for driving liquid crystal of the liquid crystal layer, the common electrode to be supplied with the common voltage may be formed on the upper substrate 114. The upper substrate 114 filters an incident light passing through the liquid crystal layer by the use of color filter, and emits a predetermined-color light to the external, whereby a predetermined color image is displayed on the display panel 110.

The aforementioned structure of the display panel 110 may be changed according to the method for driving liquid crystal of the liquid crystal layer formed between the lower substrate 112 and the upper substrate 114.

The lower polarizing member 116 is adhered to a lower surface of the lower substrate 112, wherein the lower polarizing member 116 polarizes light emitted from the backlight unit 120 to the display panel 110.

According to one embodiment of the present invention, the upper polarizing member 118 may be formed of a polarizing film, adhered to an upper surface of the upper substrate 114, for polarizing the colored-light emitted to the external through the upper substrate 114.

According to another embodiment of the present invention, the upper polarizing member 118 may include an upper polarizing film (not shown), adhered to an upper surface of the upper substrate 114, for polarizing the colored-light emitted to the external through the upper substrate 114; and a retarder film (not shown), adhered to an upper surface of the upper polarizing film, for realizing a separation of mages seen in left and right eyes into different polarizing states, that is, a three-dimensional image on the display panel 110.

The backlight unit 120 is received in the housing member 140, wherein the backlight unit 120 emits the light to the display panel 110. For this, the backlight unit 120 includes a reflective sheet 122, a light-guiding plate 124, a light source member (not shown), and an optical sheet member 126.

The reflective sheet 122 is received in the housing member 140, wherein the reflective sheet 122 is provided on a lower surface of the light-guiding plate 124. The reflective sheet 122 reflects the light incident from the light-guiding plate 124 to the display panel 110.

The light-guiding plate 124 is provided on the reflective sheet 122, wherein the light-guiding plate 124 guides the light emitted from the light source member to a frontal direction. For this, the light-guiding plate 124 may be formed in a plate shape including an incidence surface provided at one lateral side thereof, or may be provided with a lower surface of an inclined shape whose height is gradually decreased from one lateral side to the other lateral side.

The light-guiding plate 124 reflects and refracts the light incident on the incidence surface from the light source member, to thereby guide the light to the frontal direction.

The light source member is received in the housing member 140, wherein the light source member confronts the incidence surface, to thereby emit the light to the incidence surface. For this, the light source member may be provided with a plurality of light-emitting diodes.

The optical sheet member 126 is provided on the light-guiding plate 124, wherein the optical sheet member 126 enhances luminance of the light guided to the display panel 110 by the light-guiding plate 124. For this, the optical sheet member 126 may include at least one diffusion sheet and at least one prism sheet among a lower diffusion sheet, a lower prism sheet, an upper prism sheet and an upper diffusion sheet.

The cover glass 130 is provided on the display panel 110, to thereby protect the display panel 110. A black coating layer 132 is formed in an edge portion of a lower surface of the cover glass 130 so as to cover remaining areas except a display area of the display panel 110.

Also, lower and upper sides of the cover glass 130 are combined with and covered by lower and upper sides of the housing member 140. Meanwhile, when left and right sides of the cover glass 130 are respectively covered by left and right sides of the housing member 140, there is a predetermined gap (G) between the left side of the cover glass 130 and the left side of the housing member 140, and between the right side of the cover glass 130 and the right side of the housing member 140.

The housing member 140 receives the backlight unit 120 and the display panel 110 therein, and supports the cover glass 130. For this, the housing member 140 includes a support case 141, a guide panel 143, a rear housing 145, and a lateral housing 147. These elements may be formed of a metal material or a plastic material. Preferably, the these elements are formed of the plastic material suitable for enabling light-weight display device.

The support case 141 is received in the rear housing 145, wherein the support case 141 receives the guide panel 143 and the backlight unit 120 therein, and covers a lateral side of the guide panel 143. For this, the support case 141 having a U-shaped cross section includes a support plate 141a, placed onto the rear housing 145, for supporting the guide panel 143 and the backlight unit 120; and a support sidewall 141b, which is vertically bent from an end of the support plate 141a, for covering the lateral side of the guide panel 143.

The guide panel 143 is received in the support case 141, wherein the guide panel 143 supports a peripheral region of a lower surface of the display panel 110, and defines a receiving position of the backlight unit 120 received in the support case 141.

A lower surface of the guide panel 143 may be adhered to the support plate 141a of the support case 141, or adhered to the reflective sheet 122 placed on the support plate 141a by the use of first double-sided tape 144a.

A second double-sided tape 144b may be formed between an upper surface of the guide panel 143 and the peripheral region of the lower surface of the display panel 110. The second double-sided tape 144b enables to combine the peripheral region of the lower surface of the display panel 110 and the upper surface of the guide panel 143 with each other. In this case, the second double-sided tape 144b may be adhered to a peripheral region of the plurality of optical sheet members 126 as well as the upper surface of the guide panel 143. In the drawings, the peripheral region of the lower surface of the display panel 110 is combined with the upper surface of the guide panel 143 by the use of second double-sided tape 144b, but not limited to this structure. For example, the peripheral region of the lower surface of the display panel 110 may be simply placed onto a buffer pad member (not shown) adhered to the upper surface of the guide panel 143.

The rear housing 145 receives the support case 141 therein. For this, the rear housing 145 having a U-shaped cross section supports a lower surface of the support case 141, and covers some of a lateral side of the support case 141. The support case 141 may be adhered to a bottom surface of the rear housing 145 by the use of double-sided tape.

The lateral housing 147 is combined with an external lateral side of the rear housing 145, to thereby cover the respective lateral sides of the guide panel 143, the display panel 110 and the cover glass 130. In this case, the lateral housing 147 and the rear housing 145 may be combined by a hook combination method. For example, a hook-receiving groove may be formed in the external lateral side of the rear housing 145; and a hook projection, into which the hook-receiving groove is inserted, may be formed in an inner lateral side of the lateral housing 147.

An upper surface of the lateral housing 147 is positioned at the same height as an upper surface of the cover glass 130, and an upper inner lateral side of the lateral housing 147 is positioned as close as possible to the lateral side of the cover glass 130. Preferably, the upper inner lateral side of the lateral housing 147 is positioned to be in contact with the lateral side of the cover glass 130. Due to an error of manufacturing process, however, the upper inner lateral side of the lateral housing 147 is provided at a predetermined interval from the lateral side of the cover glass 130. Accordingly, a predetermined gap (G) is provided between the lateral housing 147 and an edge portion of a long side of the cover glass 130 in each of the left and right sides of the display device. That is, the gap (G) is provided between the upper inner lateral side of the lateral housing 147 and the lateral side of the cover glass 130.

Figure 1:
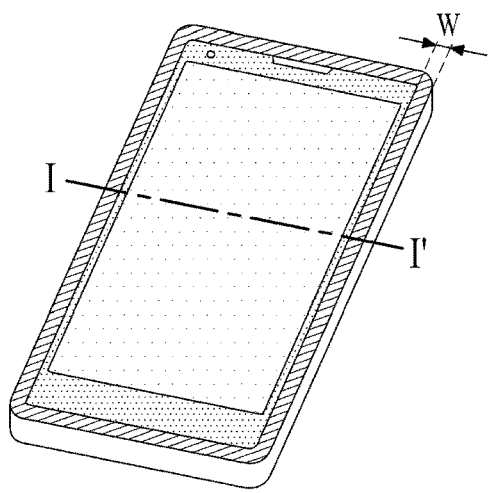
FIG. 1 is a perspective view illustrating a related art display device.
Figure 2:
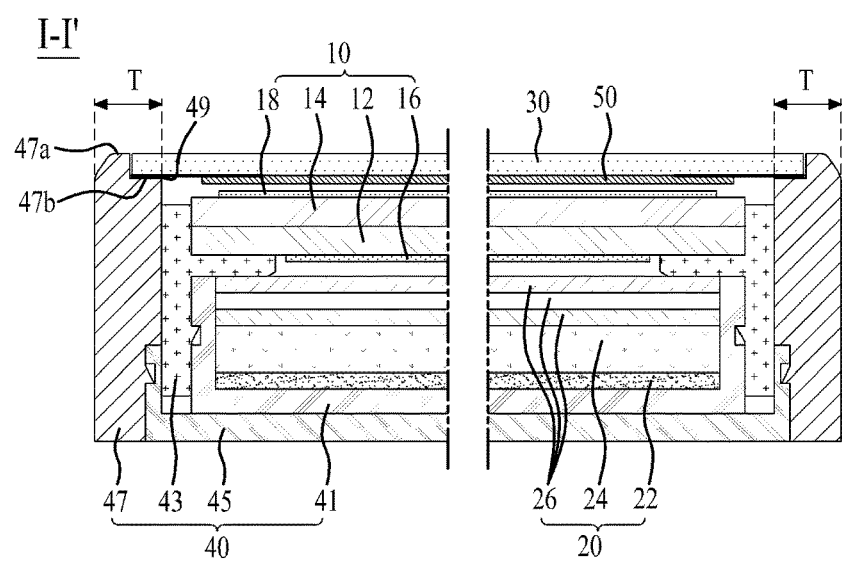
FIG. 2 is a cross sectional view along I-I' of FIG. 1.

Meanwhile, each of short sides of the cover glass 130, that is, each of upper and lower sides of the cover glass 130 is placed in a step-shaped cover glass supporter (See the cover glass supporter of FIG. 2) which is provided in each of upper and lower sides of the lateral housing 147. Accordingly, a predetermined gap (G) is not formed between an edge portion of the short side of the cover glass 130 and the lateral housing 147 in each of upper and lower sides of the display device.

The aforementioned lateral housing 147 does not support the lower edge portion of the cover glass 130, and the lateral housing 147 is positioned as close as possible to the lateral side of the cover glass 130, to thereby obtain a relatively thin width (W). Owing to the relatively thin width (W) of the lateral housing 147, it is possible to decrease a width in each of both lateral sides of the display device, that is, to decrease a bezel width. However, foreign matters such as dust or moist may penetrate into the inside of the display device through the predetermined gap (G) between the upper inner lateral side of the lateral housing 147 and the lateral side of the cover glass 130, and light emitted from the backlight unit 120 may be leaking to the external through the predetermined gap (G). Accordingly, the gap (G) is sealed by extending the left and right lateral sides of the touch sensing film 150.

In more detail, the touch sensing film 150 is adhered to the lower surface of the cover glass 130, and is placed onto the upper polarizing member 118 of the display panel 110. In this case, the touch sensing film 150 may be adhered to the entire area of the lower surface of the cover glass 130 by the use of optical clean adhesive, and simultaneously adhered to the entire area of the upper surface of the upper polarizing film 118. The touch sensing film 150 may be adhered to the lower surface of the cover glass 130 by a manual labor or a lamination process.

The touch sensing film 150 functions as a touch sensing means so as to sense a user's touch on the cover glass 130. At the same time, the touch sensing film 150 seals the aforementioned gap (G) between the lateral side of the cover glass 130 and the housing member 140. For this, the touch sensing film 150 includes a touch sensing area, and the touch sensing film 150 includes first and second extending portions 154a and 154b for sealing the gap (G), wherein each of the first and second extending portions 154a and 154b is extended to be longer than each of the left and right sides of the cover glass 130.

In order to cover the left lateral side of the display panel 110, the first extending portion 154a is extended to a predetermined length from the left lateral side of the touch sensing film 150, and is also bent to be combined with the housing member 140, that is, the external lateral side of the left sidewall of the support case 141. In this case, the first extending portion 154a may be adhered to the external lateral side of the left sidewall of the support case 141 by the use of first adhesive member 155a. The first adhesive member 155a may be a double-sided tape.

In order to cover the right lateral side of the display panel 110, the second extending portion 154b is extended to a predetermined length from the right lateral side of the touch sensing film 150, and is also bent to be combined with the housing member 140, that is, the external lateral side of the right sidewall of the support case 141. In this case, the second extending portion 154b may be adhered to the external lateral side of the right sidewall of the support case 141 by the use of second adhesive member 155b. The second adhesive member 155b may be a double-sided tape.

Figure 5:
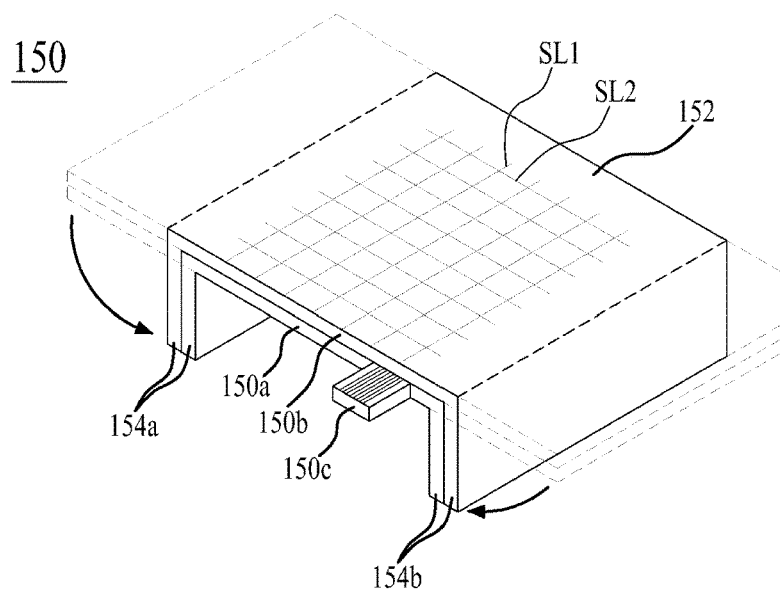
FIGS. 5 to 8 illustrate various embodiments of touch sensing film shown in FIG. 4.

FIG. 5 is a perspective view illustrating the touch sensing film shown in FIG. 4.

Referring to FIG. 5 in connection with FIG. 4, the touch sensing film 150 includes a touch sensor 152, and the first and second extending portions 154a and 154b.

The touch sensor 152 is adhered to the lower surface of the cover glass 130, wherein the touch sensor 152 is overlapped with the display area of the display panel 110. The touch sensor 152 includes a lower film 150a and an upper film 150b which are bonded to each other, wherein the lower film 150a and the upper film 150b has a size corresponding to a size of the upper substrate 114 or cover glass 130.

In the lower film 150a of the touch sensor 152, there are a plurality of first sensing electrode lines (SL1) formed at fixed intervals in a first direction. Each of the first sensing electrode lines (SL1) may be supplied with a first sensing voltage signal from a touch driver (not shown). The plurality of first sensing electrode lines (SL1) may function as signal-transmitting electrodes.

In the upper film 150b of the touch sensor 152, there are a plurality of second sensing electrode lines (SL2) formed at fixed intervals in a second direction being in perpendicular to the first direction. Each of the second sensing electrode lines (SL2) may be supplied with a second sensing voltage signal from the touch driver. The plurality of second sensing electrode lines (SL2) may function as signal-transmitting electrodes.

At one side of the aforementioned lower film 150a or upper film 150b, there is a driving connector 150c which is electrically connected with the plurality of first sensing electrode lines (SL1), and also electrically connected with the plurality of second sensing electrode lines (SL2).

The driving connector 150c having a predetermined length is protruding from one side of the lower film 150a or upper film 150b, and the driving connector 150c is connected with the touch driver, whereby the driving connector 150c supplies the first and second sensing voltage signals from the touch driver to the plurality of first sensing electrode lines (SL1) and the plurality of second sensing electrode lines (SL2). For example, the touch driver senses a change of capacitance value formed among the plurality of first sensing electrode lines (SL1) and the plurality of second sensing electrodes lines (SL2), wherein the first and second sensing electrode lines (SL1 and SL2) cross each other, to thereby sense whether or not there is the user's touch.

According to a touch sensing method of the touch sensing film 150, the plurality of second sensing electrode line (SL2) may be formed on the lower film 150a. In this case, each of the plurality of second sensing electrode lines (SL2) may be formed between each of the plurality of first sensing electrode lines (SL1). Furthermore, a shield line may be formed between the first sensing electrode line (SL1) and the second sensing electrode line (SL2).

The first extending portion 154a is extended to be longer than the cover glass 130 from the left side of the touch sensor 152, that is, the respective left sides of the lower film 150a and upper film 150b. Also, the first extending portion 154a is bent to cover the left side of the display panel 110, and is then adhered to the housing member 140, that is, the external lateral side of the left sidewall of the support case 141 by the use of first adhesive member 155a. Thus, the first extending portion 154a is closely adhered to the inner lateral side of the lateral housing 147, to thereby seal the gap (G) between the left long side of the cover glass 130 and the lateral side of the housing 147. Accordingly, it is possible to prevent foreign matters such as dust or moist from penetrating into the inside of the display device through the gap (G).

The second extending portion 154b is extended to be longer than the cover glass 130 from the right side of the touch sensor 152, that is, the respective right sides of the lower film 150a and upper film 150b. Also, the second extending portion 154b is bent to cover the right side of the display panel 110, and is then adhered to the housing member 140, that is, the external lateral side of the right sidewall of the support case 141 by the use of second adhesive member 155b. Thus, the second extending portion 154b is closely adhered to the inner lateral side of the lateral housing 147, to thereby seal the gap (G) between the right long side of the cover glass 130 and the lateral side of the housing 147. Accordingly, it is possible to prevent foreign matters such as dust or moist from penetrating into the inside of the display device through the gap (G).

Figure 6:
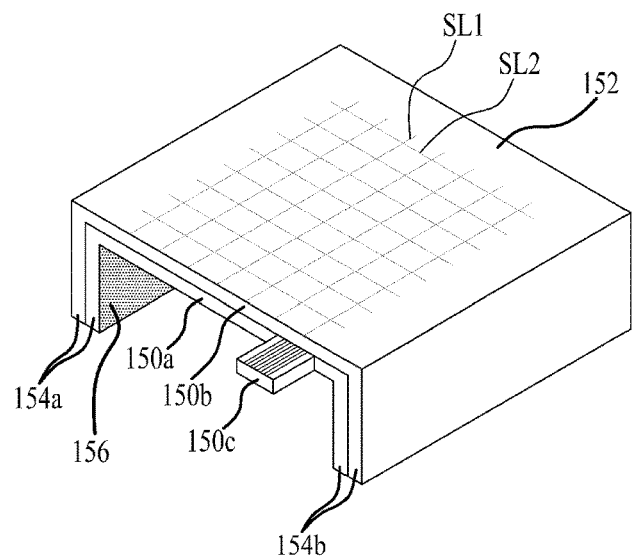

As shown in FIG. 6, the touch sensing film 150 may further include a light-leakage prevention member 156 in each of the inner lateral sides of the first and second extending portions 154a and 154b confronting the respective lateral sides of the display panel 110.

The light-leakage prevention member 156 may be formed by a coating layer coated on the respective inner lateral sides of the first and second extending portions 154a and 154b, or a tape adhered to the respective inner lateral sides of the first and second extending portions 154a and 154b. Preferably, the light-leakage prevention member 156 may be formed of black-colored coating resin or tape.

Figure 7:
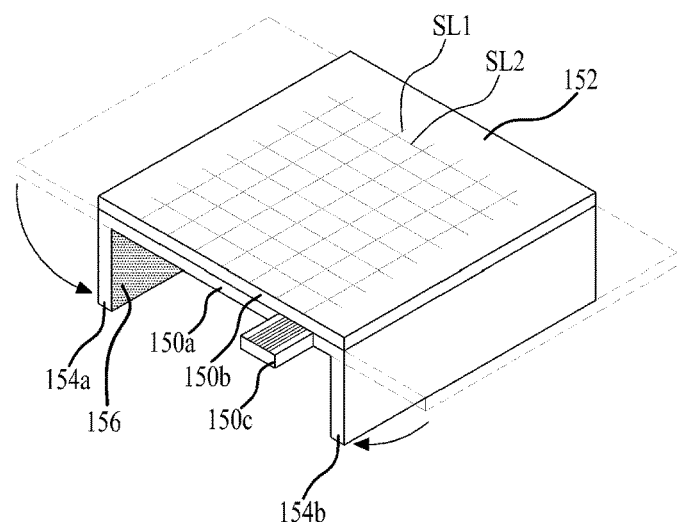
Figure 8:
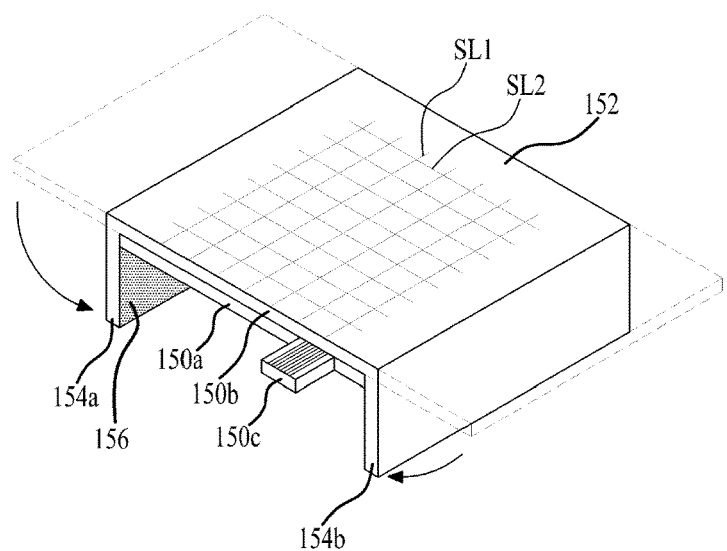

In the aforementioned touch sensing film 150, the first and second extending portions 154a and 154b extend from the lower film 150a and the upper film 150b, but it is not limited to this structure. That is, the first and second extending portions 154a and 154b may be formed only of the lower film 150a extended from the both lateral sides of the touch sensor 152, as shown in FIG. 7; or the first and second extending portions 154a and 154b may be formed only of the upper film 150b extended from the both lateral sides of the touch sensor 152, as shown in FIG. 8. In this case, if the lower film 150a and the upper film 150b have the same thickness, preferably, the first and second extending portions 154a and 154b extend from the upper film 150b. Meanwhile, if the lower film 150a and the upper film 150b have the different thicknesses, the first and second extending portions 154a and 154b extend from the relatively-thin film between the lower film 150a and the upper film 150b, preferably.

Even in case of that the first and second extending portions 154a and 154b are formed of the lower film 150a or the upper film 150b, the aforementioned light-leakage prevention member 156 is formed in each of the inner lateral sides of the first and second extending portions 154a and 154b.

In the display device according to the first embodiment of the present invention, as mentioned above, the cover glass 130 with the touch sensing film 150 adhered thereto is placed on the upper surface of the display panel 110, and the extended touch sensing film 150 seals the gap (G) between the lateral side of the cover glass 130 and the housing member 140, that is, the lateral housing 147, whereby the width (W) of the lateral housing 147 is decreased, thereby decreasing the bezel width (W) of the both lateral sides. That is, in case of the display device according to the first embodiment of the present invention, the cover glass 130 is not supported by the lateral housing 147 of the housing member 140, whereby the width (W) of the lateral housing 147 becomes thin, to thereby the bezel width (W) of the both lateral sides.

Figure 9:
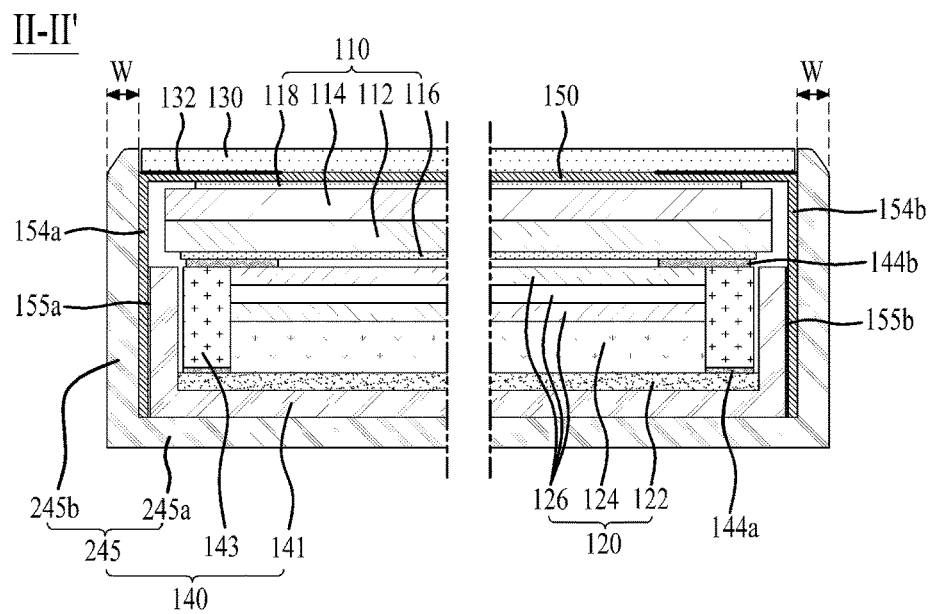
FIG. 9 is a cross sectional view illustrating a display device according to the second embodiment of the present invention, which is a cross sectional view along II-II' of FIG. 3.

FIG. 9 is a cross sectional view illustrating a display device according to the second embodiment of the present invention, which is a cross sectional view along II-II' of FIG. 3.

Referring to FIG. 9 in connection with FIG. 3, the display device according to the second embodiment of the present invention includes a display panel 110, a backlight unit 120, a cover glass 130, a housing member 140, and a touch sensing film 150. Except a structure of the housing member 140, the display device according to the second embodiment of the present invention is identical in structure to the display device according to the first embodiment of the present invention shown in FIGS. 3 to 8. Thus, wherever possible, the same reference numbers will be used throughout the drawings to refer to the same or like parts, and a detailed explanation for the same parts will be omitted.

The housing member 140 includes a support case 141, a guide panel 143, and a housing cover 245. These elements may be formed of a metal material or a plastic material. Preferably, the these elements are formed of the plastic material suitable for enabling light-weight display device.

The support case 141 and the guide panel 143 are the same as those of the aforementioned display device according to the first embodiment of the present invention, whereby a detailed explanation for the support case 141 and the guide panel 143 will be omitted.

The housing cover 245 receives the support case 141 therein, and covers the respective lateral sides of the support case 141, the display panel 110, and the cover glass 130. For this, the housing cover 245 includes a rear cover 245a and a lateral cover 245b.

The rear cover 245a supports a lower surface of the support case 141. In this case, the lower surface of the support case 141 may be adhered to the rear cover 245a by the use of double-sided tape.

The lateral cover 245b is formed by vertically bending an end portion of the rear cover 245a. The lateral cover 245b covers the respective lateral sides of the support case 141, the display panel 110 and the cover glass 130. In this case, a predetermined gap is formed between an upper inner lateral side of the lateral cover 245b and a lateral side of the cover glass 130, wherein the gaps is sealed by the use of extending portions 154a and 154b of the touch sensing film 150. A function of the lateral cover 245b is the same as that of the aforementioned lateral housing 147 shown in FIG. 4. Accordingly, the display device according to the second embodiment of the present invention is formed by removing the lateral housing 147 of the first embodiment of the present invention, whereby the display device according to the second embodiment of the present invention is provided with the decreased number of elements.

Figure 10:
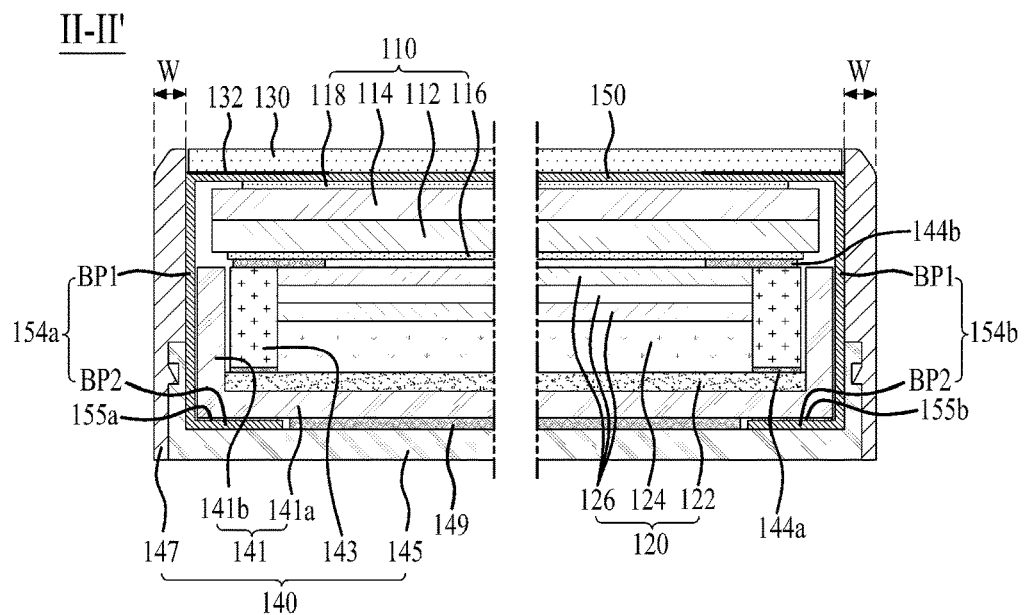
FIG. 10 is a cross sectional view illustrating a display device according to the third embodiment of the present invention, which is a cross sectional view along II-II' of FIG. 3.

FIG. 10 is a cross sectional view illustrating a display device according to the third embodiment of the present invention, which is a cross sectional view along II-II' of FIG. 3.

Referring to FIG. 10 in connection with FIG. 3, the display device according to the third embodiment of the present invention includes a display panel 110, a backlight unit 120, a cover glass 130, a housing member 140, and a touch sensing film 150. Except a structure of the touch sensing film 150, the display device according to the third embodiment of the present invention is identical in structure to the display device according to the first embodiment of the present invention shown in FIGS. 3 to 8. Thus, wherever possible, the same reference numbers will be used throughout the drawings to refer to the same or like parts, and a detailed explanation for the same parts will be omitted.

In the aforementioned display device according to the first embodiment of the present invention, the touch sensing film 150 is extended and adhered to the support sidewall 141b of the support case 141. However, in case of the display device according to the third embodiment of the present invention, the touch sensing film 150 is extended and adhered to a lower edge portion of a support case 141.

In more detail, respective extending portions 154a and 154b of the touch sensing film 150 are extended from both lateral sides of a touch sensor (See '152' of FIG. 5), and are then adhered to the lower edge portions of the left and right sides of the support case 141. The respective extending portions 154a and 154b include first bending portions (BP1) for covering the lateral sides of the display panel 110, and support sidewalls 141b of the left and right sides (or long side) of the support case 141; and second bending portions (BP2) for covering the lower edge portions of the left and right sides of a support plate 141a. The respective second bending portions (BP2) are adhered to the lower edge portion of the support plate 141a by the use of adhesive members 155a and 155b.

In the display device according to the third embodiment of the present invention, the support case 141 is combined with a bottom surface of a rear housing 145 by the use of combining member 149. In this case, the combining member 149 may be a double-sided tape, an adhesive, or a plurality of screws.

In the display device according to the third embodiment of the present invention, the housing member 140 may include the support case 141, a guide panel 143, the rear housing 145 and the lateral housing 147, in the same manner as the display device according to the first embodiment of the present invention shown in FIG. 4; or the housing member 140 may include the support case 141, a guide panel 143 and a housing cover 240, in the same manner as the display device according to the second embodiment of the present invention shown in FIG. 9.

Figure 11:
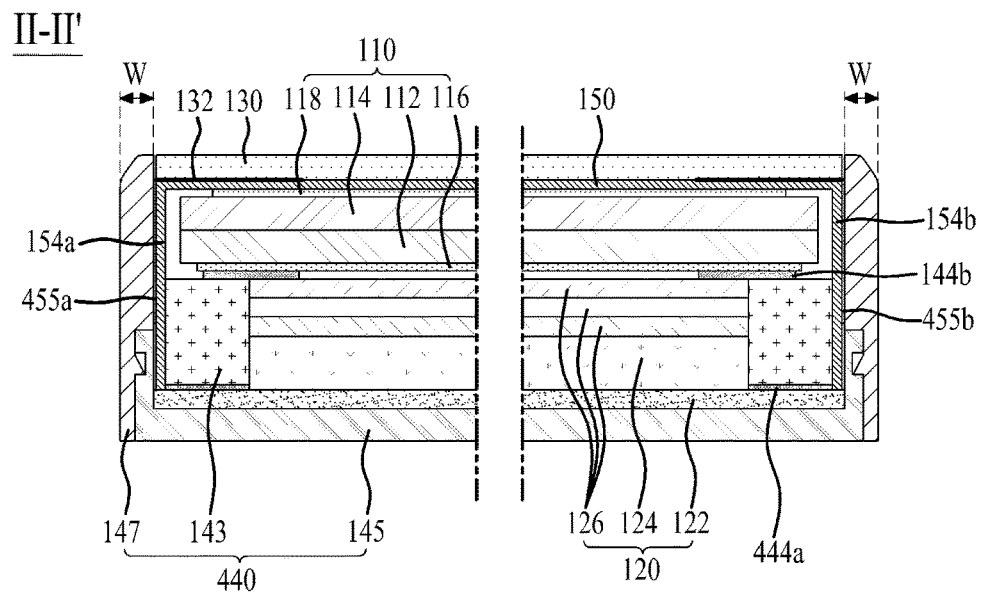
FIG. 11 is a cross sectional view illustrating a display device according to the fourth embodiment of the present invention, which is a cross sectional view along II-II' of FIG. 3.

FIG. 11 is a cross sectional view illustrating a display device according to the fourth embodiment of the present invention, which is a cross sectional view along II-II' of FIG. 3.

Referring to FIG. 11 in connection with FIG. 3, the display device according to the fourth embodiment of the present invention includes a display panel 110, a backlight unit 120, a cover glass 130, a housing member 440, and a touch sensing film 150. Except a structure of the housing member 440, the display device according to the fourth embodiment of the present invention is identical in structure to the display device according to the first embodiment of the present invention shown in FIGS. 3 to 8. Thus, wherever possible, the same reference numbers will be used throughout the drawings to refer to the same or like parts, and a detailed explanation for the same parts will be omitted.

The housing member 440 includes a guide panel 143, a rear housing 145, and a lateral housing 147. The housing member 440 may be obtained by removing the support case (See '141' of FIG. 4) from the housing member 140 of the display device according to the first embodiment of the present invention.

The guide panel 143 is adhered to a reflective sheet 122 of the backlight unit 120 by the use of first double-sided tape 444*a*. Meanwhile, the guide panel 143 may be adhered to a bottom surface of the rear housing 145 by the use of first double-sided tape 444*a*.

The rear housing 145 receives the backlight unit 120 and the guide panel 130 therein. For this, the rear housing 145 having a U-shaped cross section supports the reflective sheet 122 of the backlight unit 120, and covers some area of a lateral side of the guide panel 130.

The lateral housing 147 is combined with an external lateral side of the rear housing 145, to thereby cover respective lateral sides of the guide panel 143, the display panel 110, and the cover glass 130. In this case, the lateral housing 147 and the rear housing 145 may be combined by a hook combination method.

First and second extending portions 154*a* and 154*b* of the touch sensing film 150 are extended to cover the lateral sides of the display panel 110 and the guide panel 143, and are then adhered to an inner lateral side of the lateral housing 147 by the use of first and second adhesive members 455*a* and 455*b*, to thereby seal a gap between the respective lateral sides of the lateral housing 147 and the cover glass 130.

The display device according to the fourth embodiment of the present invention is provided with the housing member 440 obtained by removing the support case (See '141' of FIG. 4) from the housing member 140 of the display device according to the first embodiment of the present invention, so that it is possible to decrease the number of elements in the display device.

Figure 12:
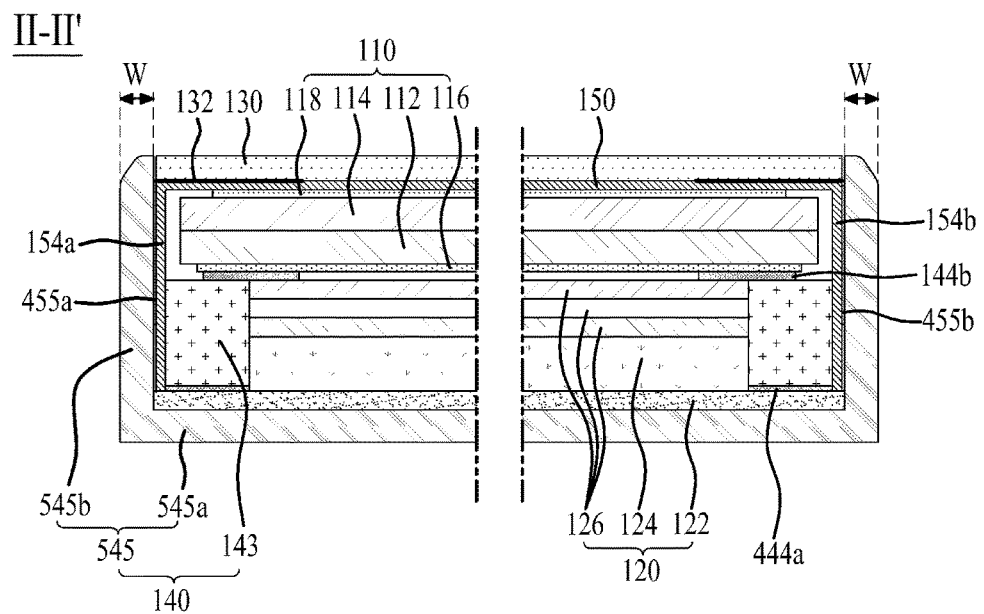
FIG. 12 is a cross sectional view illustrating a display device according to the fifth embodiment of the present invention, which is a cross sectional view along II-II' of FIG. 3.

FIG. 12 is a cross sectional view illustrating a display device according to the fifth embodiment of the present invention, which is a cross sectional view along II-II' of FIG. 3.

Referring to FIG. 12 in connection with FIG. 3, the display device according to the fifth embodiment of the present invention includes a display panel 110, a backlight unit 120, a cover glass 130, a housing member 140, and a touch sensing film 150. Except a structure of the housing member 140, the display device according to the fifth embodiment of the present invention is identical in structure to the display device according to the fourth embodiment of the present invention shown in FIG. 11. Thus, wherever possible, the same reference numbers will be used throughout the drawings to refer to the same or like parts, and a detailed explanation for the same parts will be omitted.

The housing member 140 includes a guide panel 143 and a housing cover 545.

The guide panel 143 is the same as that of the display device according to the fourth embodiment of the present invention, whereby a detailed explanation for the guide panel 143 will be omitted.

The housing cover 545 receives the backlight unit 120 and the guide panel 143 therein, and covers respective lateral sides of the guide panel 143, the display panel 110 and the cover glass 130. For this, the housing cover 545 includes a rear cover 545*a* and a lateral cover 545*b*.

The rear cover 545*a* supports the backlight unit 120 and the guide panel 143. In this case, a reflective sheet 122 of the backlight unit 120 may be adhered to the rear cover 545*a* by the use of double-sided tape.

The lateral cover 545*b* is formed by vertically bending an end portion of the rear cover 545*a*. The lateral cover 545*b* covers the respective lateral sides of the guide panel 143, the display panel 110 and the cover glass 130. In this case, a gap is formed between an upper inner lateral side of the lateral cover 545*b* and a lateral side of the cover glass 130, wherein the gaps is sealed by extending portions 154*a* and 154*b* of the touch sensing film 150. A function of the lateral cover 545*b* is the same as that of the aforementioned lateral housing 147 shown in FIG. 11. Accordingly, the display device according to the fifth embodiment of the present invention is formed by removing the lateral housing 147 of the fourth embodiment of the present invention, whereby the display device according to the fifth embodiment of the present invention is provided with the decreased number of elements.

In the aforementioned drawings, the display devices according to the embodiments of the present invention are mainly LCD devices with the backlight unit 120 provided therein, but it is not limited to the LCD devices. For example, the display devices according to the embodiments of the present invention may be various flat display devices such as organic light-emitting display (OLED) devices. The display device of the OLED device may include a display panel comprising an organic light-emitting device on an upper substrate or a lower substrate, whereby a predetermined image is displayed according as the organic light-emitting device is driven. In this case, the backlight unit may be removed from the display device shown in FIG. 4. If needed, the support case of the housing member and/or the guide panel may be removed from the display device shown in FIG. 4.

The display devices according to the embodiments of the present invention may be applied to not only the portable terminal shown in FIG. 3 but also a television, a computer monitor, a tablet computer, various mobile information devices, and a display area of notebook computer.

Accordingly, in case of the display device of the present invention, the both lateral sides of the cover glass are not combined with the lateral housing member, whereby the width of the lateral housing is decreased, to thereby decrease the bezel width in the both lateral sides of the display device.

In the display device according to the present invention, the touch sensing film adhered to the lower surface of the cover glass is extended to seal the gap between the lateral side of the cover glass and the housing member, so that it is possible to prevent the foreign matters such as dust or moist from penetrating into the inside of the display device through the gap, thereby improving quality and endurance of the display device.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
   a display panel;
   a cover glass on an upper surface of the display panel;
   a backlight unit that emits light to the display panel;
   a housing member that receives the backlight unit and the display panel, and covers lateral and rear sides of the backlight unit and a lateral side of the cover glass, the housing member including a guide panel supporting a peripheral region of a lower surface of the display panel and defining a receiving position of the backlight unit, and a lateral housing receiving the backlight unit and covering the lateral side of the cover glass and a lateral side of the guide panel; and
   a touch sensing film that seals a gap between the lateral side of the cover glass and the lateral housing, the touch sensing film comprising a touch sensor adhered to a lower surface of the cover glass and an extending portion perpendicular to the touch sensor,
   wherein the backlight unit includes a reflective sheet received in the housing member and adhered to lower surface of the guide panel,
   wherein the extending portion of the touch sensing film is disposed immediately above an edge of the reflective sheet between the lateral housing and the lateral side of the guide panel, and
   wherein the touch sensing film further includes a light-leakage prevention member provided in an inner lateral side of the extending portion confronting a lateral side of the display panel and the lateral side of the guide panel.

2. The display device according to claim 1, wherein the cover glass overlaps the extending portion and the gap is disposed immediately above the extending portion of the touch sensing film.

3. The display device according to claim 1,
   wherein the touch sensor of the touch sensing film is supported on the upper surface of the display panel, and
   wherein the extending portion seals the gap and extends from the each of both lateral sides of the touch sensor to be longer than the cover glass.

4. The display device according to claim 3, wherein the extending portion extends from the each of both lateral sides of the touch sensor, and is bent to cover the lateral side of the display panel, and is adhered to the housing member.

5. The display device according to claim 3, wherein the extending portion extends from the each of both lateral sides of the touch sensor, and is bent to cover the lateral side of the display panel and the lateral side of the guide panel.

6. The display device according to claim 3, wherein the extending portion is adhered to the lateral side of the guide panel confronting an inner lateral side of the lateral housing.

7. The display device according to claim 3,
   wherein the touch sensing film includes upper and lower films with sensing electrode lines, the upper and lower films confronting each other and bonded to each other, and
   wherein the extending portion extends from at least any one of the upper and low films.

8. The display device according to claim 7, wherein the extending portion extends from each of both lateral sides of the touch sensor to correspond with both long lateral sides of the cover glass.

9. The display device according to claim 3,
   wherein the light-leakage prevention member comprises one of a coating layer coated on the inner lateral side of the extending portion, or a tape adhered to the inner lateral side of the extending portion.

10. The display device according to claim 1, wherein the housing member further includes a rear housing that receives the reflective sheet therein.

11. The display device according to claim 10, wherein,
    the rear housing comprises a hook-receiving groove disposed in the external lateral side of the rear housing,
    the lateral housing comprises a hook projection disposed in an inner lateral side of the lateral housing, and
    the hook projection inserts into the hook-receiving groove.

12. The display device according to claim 1, wherein the housing member further includes a housing cover including a rear cover that receives the reflective sheet therein.

13. The display device according to claim 12, wherein the lateral housing is vertically bent from the rear cover, and covers respective lateral sides of the guide panel, the display panel and the cover glass.

14. The display device according to claim 1, further comprising an adhesive member disposed between the peripheral region of the lower surface of the display panel and an upper surface of the guide panel to combine the display panel and the guide panel with each other.

15. The display device according to claim 14, wherein the backlight unit further includes a light-guiding plate disposed on the reflective sheet, and an optical sheet member disposed on the light-guiding plate,
    wherein the adhesive member is disposed to a peripheral region of the optical sheet member as well as the upper surface of the guide panel.

16. The display device according to claim 1, wherein the cover glass includes a black coating layer formed in an edge portion overlapping between the lateral side of the display panel and an inner lateral side of the lateral housing.

* * * * *